123,934

UNITED STATES PATENT OFFICE.

PHILLIP ROSKOPF, OF BROOKLYN, E. D., NEW YORK.

IMPROVEMENT IN MEDICAL COMPOUNDS FOR CURE OF PILES.

Specification forming part of Letters Patent No. 123,934, dated February 20, 1872.

*To all whom it may concern:*

Be it known that I, PHILLIP ROSKOPF, of Brooklyn, E. D., in the county of Kings and State of New York, have invented a new and Improved Medical Compound; and I do hereby declare that the following is a full, clear, and exact description thereof.

This invention relates to a compound which is principally intended as a preventive and remedy for piles, and which, in many cases, has proved to be of great benefit to patients. My compound is prepared, by apothecaries' weight, of powdered jalap-root, four drachms; powdered valerian-root, two drachms; extract hyosciamus, six grains; gum-resin guaiacum, one-half ounce; calomel, twelve grains; golden sulphide of antimony, thirty grains; flowers of sulphur, one ounce; tartrate potassa, one ounce. These ingredients are intimately mixed in any desired manner, and are put up in the form of a powder, which is taken as a preventive and remedy for piles. It is found to produce beneficial results when a teaspoonful is taken three times a day for three or four successive days. The ingredients will by their action separate the piles, and the impurities in the blood and in the bowels, which have a tendency to form piles, be driven out or expelled from the system.

Having thus described my invention, what I claim as new, and desire to secure by Letters Patent, is—

A medical compound, made substantially in the manner herein described.

This specification signed by me this 31st day of January, 1872.

DR. PH. ROSKOPF.

Witnesses:
W. HAUFF,
JOHN ROSKOPF.